Patented May 17, 1932

1,858,334

UNITED STATES PATENT OFFICE

RHYS JENKIN LOVELUCK, ERNEST GEORGE BECKETT, AND JOHN THOMAS, OF GRANGEMOUTH, SCOTLAND, ASSIGNORS TO SCOTTISH DYES LIMITED, OF GRANGEMOUTH, SCOTLAND

PRODUCTION OF ORTHO-AMINO-HALOGEN-ANTHRAQUINONES

No Drawing. Application filed December 21, 1929, Serial No. 415,786, and in Great Britain December 28, 1928.

This invention relates to the production of dyestuffs and intermediates, especially to the production of 1-amino-2-chlor-anthraquinone, which may be regarded as a difficult intermediate to prepare in a good state of purity.

The principal object of the invention is to provide an improved or modified process for the above purpose.

The invention in brief consists in the production of 1-amino-2-chlor-anthraquinones from 1-amino-anthraquinone-2-sulphonic acid by a process which consists in first oxidizing the amino group, then replacing the sulphonic acid group in the resulting compound by chlorine, and then reducing to obtain the amino-halogen-anthraquinone.

The invention also consists in a process for the production of 1-amino-2-chlor-anthraquinone in a state of good purity, which comprises oxidation of anthraquinone-1-amino-2-sulphonic acid by potassium persulphate in sulphuric acid (presumably with the formation of anthraquinone-1-nitroso-2-sulphonic acid), treatment with hydrochloric acid and sodium chlorate in aqueous solution at a temperature of about 100° C. (presumably for the replacement of the sulphonic acid group by chlorine with the formation of 1-nitroso-2-chlor-anthraquinone), reduction of the product by warming with sodium hydrosulphide for the formation of 1-amino-2-chlor-anthraquinone.

The invention also consists in processes substantially as herein described, including the new individual stages.

The invention also consists in products such as may be made by processes or stages of the processes herein described, or by the obvious chemical equivalents thereof, including the intermediate products, for example, 1-nitroso-anthraquinone-2-sulphonic acid; 1-nitroso-2-chlor-anthraquinone.

The following examples illustrate how the invention may be carried into effect, references to parts and percentages being to parts and percentages by weight:—

Example 1

This describes the oxidation of anthraquinone-1-amino-2-sulphonic acid to a body which appears to be anthraquinone-1-nitroso-2-sulphonic acid.

10 parts of anthraquinone-1-amino-2-sulphonic acid are dissolved in about 110 parts of sulphuric acid of about 95% strength. 60 parts of potassium persulphate are also added to about 200 parts of water and stirred; about half of the material remains undissolved. To this the sulphuric acid solution is slowly run in, keeping the temperature below 30° C. When all is in, the temperature is raised during about two or three hours to 100° C., and maintained for a little longer until oxidation is complete. The mixture is then poured into water and the product salted out, filtered, washed and dried.

Example 2

This is an example of the conversion of the product of Example 1 to the corresponding chlor-derivative by replacement of the sulphonic acid group.

14 parts of the dry substance obtained according to Example 1 are dissolved in 175 parts of water and 35 parts of concentrated hydrochloric acid are added. The solution is boiled under reflux while 175 parts of 4% solution of sodium chlorate are run in during three hours. The mixture is then heated at or near the boil for a few hours longer, the product being analyzed from time to time. The mixture is then filtered hot, when if any unchanged sulphonic acid body is present, this is removed, and the precipitate washed acid free and dried.

Instead of 14 parts of dry substance from Example 1 referred to above, the solution obtained in Example 1 containing the same quantity of product may be used for treatment with halogen acid and chlorate.

Example 3

This is an example of the reduction of the product obtained in Example 2.

A sufficient quantity of the substance in paste form to equal 10 parts of the dry is stirred into 200 parts of a normal solution of sodium hydrosulphide. The whole is then heated with stirring to 60° C. for three hours, then cooled, filtered, washed with water and dried.

Example 4

This is an example of the purification of 1-amino-2-chlor-anthraquinone obtained in Example 3.

10 parts of the dry substance are dissolved in 40 parts of sulphuric acid of about 94–98% strength, and stirred at 80° C. until completely dissolved. Water is then run in to dilute the acid to 70% strength and filtered. The sulphate of the 1-amino-2-chlor-anthraquinone is precipitated. Both the mixing with water and the filtration are carried out at 80–85° C. The precipitate is treated with water to decompose the sulphate, filtered, washed acid free and dried.

General

The 1-amino-2-chlor-anthraquinone may be purified, for instance, by re-crystallization from sulphuric acid or from organic solvents, for example, as indicated in specification No. 268,537 (British).

Any per-acid may be used for oxidation according to the present invention.

The replacement of the sulphonic acid group may be effected by treatment at moderate temperatures with substances yielding halogens, preferably in aqueous solution at or near the boiling point.

For reduction, sodium hydrosulphide may conveniently be used, as well as like reducing bodies, such as sulphuretted hydrogen and ammonia and cold neutral hydrosulphite. We prefer to avoid sodium sulphide.

Having now described our invention, what we claim as new and desire to secure by Letters Patent is:—

1. A process for the production of 1-amino-2-chlor-anthraquinone in a state of good purity, which comprises mixing together anthraquinone-1-amino-2-sulphonic acid and potassium per sulphate in sulphuric acid, mixing the product with hydrochloric acid and sodium chlorate in an aqueous solution at a temperature of about 100° C., and mixing the product thus obtained with sodium hydrosulphide.

2. 1-nitroso-2-chlor-anthraquinone.

In testimony whereof we have signed our names to this specification.

RHYS JENKIN LOVELUCK.
ERNEST GEORGE BECKETT.
JOHN THOMAS.